United States Patent [19]

Lee

[11] 4,267,476

[45] May 12, 1981

[54] METAL-SOLID LUBRICANT BRUSHES FOR HIGH-CURRENT ROTATING ELECTRICAL MACHINERY

[75] Inventor: Pang-Kai Lee, Murrysville, Pa.

[73] Assignee: Westinghouse Electric Corp., Pittsburgh, Pa.

[21] Appl. No.: 51,914

[22] Filed: Jun. 25, 1979

[51] Int. Cl.$^3$ ........................ H02K 13/00; H01R 39/24

[52] U.S. Cl. ........................ 310/251; 310/248; 310/55

[58] Field of Search ........................ 310/248, 251-253, 310/227, 228, 220, 221, 178, 55, 238, 246

[56] References Cited

U.S. PATENT DOCUMENTS

| | | | |
|---|---|---|---|
| 3,382,387 | 5/1968 | Marshall | 310/251 X |
| 3,666,636 | 5/1972 | Tomaszewski et al. | 204/16 |
| 3,668,451 | 6/1972 | McNab | 310/248 |

FOREIGN PATENT DOCUMENTS

| | | | |
|---|---|---|---|
| 1057580 | 3/1954 | France | 310/251 |
| 27621 | of 1912 | United Kingdom | 310/251 |
| 1256757 | 12/1971 | United Kingdom | 310/178 |
| 386464 | 8/1973 | U.S.S.R. | 310/251 |

*Primary Examiner*—Mark O. Budd
*Attorney, Agent, or Firm*—D. P. Cillo

[57] ABSTRACT

A high-current electrical machine, comprises a moving member and at least one current collector brush in interface contact with the moving member where the brush comprises a plurality of metal fibers plated with a metal-lubricant coating, the metal fiber and coating being annealed together, the coating being effective to provide a lubricating effect and minimize wear at the area of brush contact with the rotating member.

8 Claims, 4 Drawing Figures

METAL-SOLID LUBRICANT BRUSHES FOR HIGH-CURRENT ROTATING ELECTRICAL MACHINERY

GOVERNMENT CONTRACT

The Government has rights in this invention pursuant to Contract No. N00014-76-C-0683 awarded by the Department of the Navy.

BACKGROUND OF THE INVENTION

It is necessary in many electrical machines to provide an electrically conducting path between two members which are moving relative to one another. In dynamoelectric machines, for example, it is common to use a brush of electrically conducting material sliding on the surface of a slip-ring or commutator, to provide a current path between the rotor and an external connection. A principal requirement of such a brush is that it be able to carry a high current per unit area of interface between the brush and the surface which it contacts, and it should have high wear resistance, and low friction.

Solid carbon, graphite, and carbon-metal blocks have been used for brushes in the past. These blocks were limited to current densities of about 100 Amp./in.$^2$, for satisfactory operation in air. With such brushes, however, typically only about 1/10,000 of the brush face surface area is available as an actual interface contact for current transfer. This is due to irregular brush and slip-ring surface topography, oxide films present in the area of interface contact, and the accumulation of surface debris. High load forces, to improve brush contact, have resulted in high brush friction and wear.

McNab, in U.S. Pat. No. 3,668,451, attempted to remedy contact problems by using encased, multi-element brushes of silver or silver-copper, electro-plated or vacuum deposited on aluminum oxide or boron nitride non-conducting fibers. These brushes, coated with a simple all metal film, provided good contact surface area along with high strength and flexibility. They could be used for current densities on the order of about 1,000 Amp./in.$^2$, at continuous sliding speeds of up to about 18,000 ft./min. They presented heat and wear problems, however, and required disposing a lubricating material film such as molybdenum disulphide or a coating such as graphite or metal-graphite on the rotating rotor or on the slip-rings. This proved to be complicated and not completely effective.

With the last fifteen years, a large amount of interest has been shown in the development of homopolar machines for ship and vehicle propulsion and for inertial pulsed energy storage applications. Generally, these are machines in which the magnetic field and the current flowing in the active conductors maintain the same direction with respect to those conductors while the machine is in steady operation.

For high efficiency and acceptable machine size, the current collection systems for these high-current rotating machines must operate under very severe conditions. The current density levels at the brush contact interface may be as high as 5,000 Amp./in.$^2$ at continuous sliding speeds of up to 20,000 ft./min. Pulsed duty machinery may call for 25,000 Amp./in.$^2$ at 65,000 ft./min., at times, for hundreds of milliseconds.

Marshall, in U.S. Pat. No. 3,382,387, provided self-lubricating multi-element brushes, each element consisting of a copper or silver metal sheath containing weld inhibiting, conducting, lubricating powdered graphite.

The graphite formed a conductive lubricating film, which while preventing metal sheath contact with the moving metal surface and thus an alloying effect, preserved direct electrical contact between the metal sheath and the moving metal surface. The brushes could be used for current densities on the order of 5,000 Amp./in.$^2$ at continuous sliding speeds of up to 33,000 ft./min. These type of brushes, however, tend to be somewhat inflexible, and filling the sheath, which has an inside diameter of about 0.02 inch, with graphite presents a fabrication problem. Also, at current densities over 5,000 Amp./in.$^2$ at 50,000 ft./min., the metal constituent must have unique lubrication, electrical power transfer, and heat dissipation requirements not yet met in the industry.

British Pat. No. 1,256,757 attempted to solve all current collection problems in homopolar dynamoelectric machines, by using a very sophisticated and costly liquid metal current collection system of the sodium-potassium type. While these metal type current collection systems need not worry about lubrication, and provide high electrical conductivity and intimacy of contact, they also pose serious machine, design, turbulence, toxicity and material compatibility problems.

In order for homopolar and other types of high-current rotating electrical machines to be economically attractive, new types of current collection means must be developed that are simple and inexpensive, and which keep frictional, electrical, and mechanical current collection losses at a minimum.

SUMMARY OF THE INVENTION

The above-described problems are solved and the above need is met, by providing a high-current rotating electrical machine, having a rotating member and at least one current collector brush in frictional contact with the rotating member; where wear is minimized at the area of frictional contact by providing an electrical contact current transfer brush, comprising a plurality of metal fibers, preferably copper, each fiber electro-codeposition plated with a metal-lubricant coating, the coating metal being selected from at least one of the group consisting of silver, nickel, and copper, the metal forming a matrix for uniformly distributed lubricant particles having an average particle size of between about 0.5 micron to about 75 microns; where the metal fiber and coating are heat annealed together.

BRIEF DESCRIPTION OF THE DRAWINGS

For a better description of the invention, reference may be made to the preferred embodiments exemplary of the invention, shown in the accompanying drawings, in which.

DESCRIPTION OF THE PREFERRED EMBODIMENTS

Figure 1:
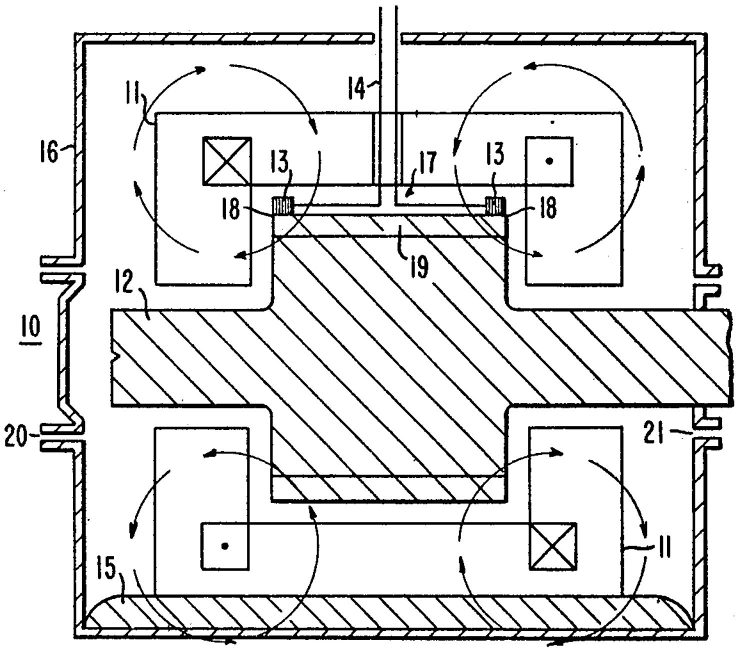
FIG. 1 is a schematic illustration of an enclosed, drum-shaped, homopolar dynamoelectric machine.

Referring to FIG. 1 of the drawings, an enclosed, drum-shaped, high-current, homopolar dynamoelectric rotating machine 20 is shown. The theory of homopolar machines dates back to 1831 when Michael Faraday exhibited the first homopolar generator at the Royal Society. Faraday demonstrated that a voltage could be generated by rotating a disk between the poles of a horse-shoe magnet and collecting current at the inside and outside diameters of the disk.

A characteristic of a homopolar machine is that the armature winding is composed of two segments; one rotating and one stationary. This configuration limits the number of turns that can be used in the armature. Therefore, since the armature winding has a small number of turns, the homopolar machine has inherently low voltage and high current. Development of these machines has been limited over the years since 1831, because the large currents must be transmitted through sliding contacts between the rotating and stationary members.

Homopolar machines can be grouped in two categories: the disk type and the drum type. For the disk type, an axial magnetic field produced by a solenoidal DC magnet is cut by a disk-shaped rotor, which is moving in a plane perpendicular to the field. As the disk is rotated a voltage is developed in the radial direction due to an increasing linkage of the magnetic field. By placing brushes on the outside diameter of the disk and at the center of the disk, electrical power can be extracted equivalent to the input mechanical power minus the mechanical and electrical losses in the system.

For the drum-type homopolar machine shown in FIG. 1, a radial magnetic field, produced by solenoidal d.c. magnet coils in the stator 11 and shown as dotted arrows, is cut by a drum-shaped rotor 12. As the drum rotates, a voltage is generated. If brushes 13 are placed on either end of the drum-shaped rotor, electrical power can be extracted from this system via leads 14. A base 15 and enclosure 16 are also shown, along with air gap 17, in which, the rotor 12 rotates. The rotor conducting path moves transverse by to the magnetic lines of force in the air gap.

The solid drum homopolar machine has the same mechanical and electrical limitations as the solid disk homopolar machine, where high peripheral velocities limit the design of the sliding electrical brush contacts 13. Voltage of these machines can be increased, for the disk type, by segmenting the disks and connecting the segments in series, or by connecting several disks in series. For the drum-type homopolar machine, voltage can be increased by segmenting the drums and connecting the segments in series, or by connecting several drums in series. The term "homopolar machine" is meant to include all of these various configurations.

Applicant's invention relates to transferring current in rotating dynamoelectric machines, and involves the use of a multi-element brush, composed of a large number of metal fibers which are electro-co-deposited with a metal-lubricant coating. The brushes 13 have a pressure or load applied to them so that they are in electrical contact with the rotor interface 18 at the surface of the slip ring. The brushes make a suitable mechanical and electrical contact to an electrical circuit through attached leads 14. The drum rotor 12, shown in FIG. 1, if it is made of steel, can have an aluminum, copper, or other highly electrically conductive rim 19 joined to its outside surface. A cooling gas can be continuously passed through the machine, such as by entry at inlets 20 and exit at outlets 21.

The brush of this invention preferably comprises a plurality of elements, generally from 5 to 100,000. While single brushes 13 are shown, the brushes could be of a circular configuration around the periphery of the rotor and could comprise from hundreds to thousands of elements. The brush fibers can be loosely held together, or pressed tightly to form a type of subdivided, packed, brush of separate, individually plated fibers. Suitable fibers are selected from metals such as silver, rhodium, gold, cobalt, aluminum, molybdenum, copper, and alloys thereof. Copper is preferred. The fibers, if circular, preferably have a thickness or diameter of between $4\times10^{-4}$ inch to $4\times10^{-2}$ inch (10 to 1,000 microns). The fibers in the brush are cut to have a free length, i.e. a length outside of the holder, of, preferably, between about 0.08 inch to about 1.0 inch (2 to 25 millimeters).

Fiber diameters less than $4\times10^{-4}$ inch provide a fragile brush when coated with solid lubricant due to the relatively large inclusion particles, and require a very short length or a reduced load, which may allow poor brush-slip ring contact. Fiber diameters over $4\times10^{-2}$ inch provide a stiff brush with too much metal-to-metal contact, and would require an increased load for good brush-slip ring contact. The slip ring can be made from materials similar to those used for the brushes, preferably copper, copper alloys or silver plated copper.

Subdivision of the brush into many metallic elements permits a corresponding dispersion of the mechanical force over the sliding interface. Freedom of independent motion of each fiber is preferred, to assure equal sharing of the load and ability to follow irregularities in the slip ring surface. Each element can then be considered as a separate contact with a greatly reduced force. This, in combination with the electro-co-deposited metal-lubricant coatings described hereinbelow, permits unusually high current transfer capacity through the multiple contacts, but essentially prevents excessive wear or local welding. Importantly, a proper selection of the lubricant in the coating also permits the resulting brush to be adequately operated in various environments, i.e. dry, humid, hydrocarbon vapor or vacuum.

A metal-solid lubricant composite coating on brush fibers has been obtained by the application of electro-co-deposition techniques. Electrodeposited composite coatings consist of a metal and a co-deposited dispersed particulate metal or non-metal. They are produced by suspending the selected particulate material in a conventional plating electrolyte. The solid particles are held in suspension throughout the plating period by mechanical agitation.

The method used to co-deposit fine, insoluble particles with metal is to keep the particles in suspension in the electrolyte while the metal is being deposited at an optimal condition. The entrapment of solid particles into the growing metal film is attributed to electrophoresis and also to the adsorption of electric charges or ions on the particle surface. Thus, the particle inclusion contents in the composite coating are influenced by the degree of agitation and the current density applied to the formation of composite coatings and also the acidity (pH) of the plating medium. The addition of certain monovalent heavy metal ions ($Tl^{+}$, $Rb^{+}$, or $Cs^{+}$), aliphatic amines (polyamines and polyimines), and other surface active compounds in the electrolyte can modify the electric charge on the particle surface, thereby promoting extensive and uniform co-deposition. Other factors affecting the co-deposition include the deposition temperature, the composition of the electrolyte, and the size as well as the concentration of the insoluble particles in the electrolyte. This type of electro-co-deposition is well known. The use of aliphatic amines in acid copper sulphate plating baths, for co-deposition, is described in detail in U.S. Pat. No. 3,666,636.

The plurality of individual metal fibers of the brushes used in this invention are plated with a metal-lubricant coating by electro-co-deposition. The metal is selected from the group consisting of silver, nickel, copper and their mixtures, with silver preferred. The metal will constitute between about 80 volume percent to about 98 volume percent of the coating, preferably 85 volume percent to 95 volume percent. The lubricant is in finely divided discrete particulate form and is selected from well known lubricants, such as graphite, $MoS_2$, $MoSe_2$, $WS_2$, $WSe_2$, $NbS_2$, $NbSe_2$, $TaS_2$, $TaSe_2$, BN and their mixtures. The lubricant will have an average particle size range of between about 0.5 micron to about 75 microns, preferably 1.5 microns to 20 microns, and constitutes from between about 2 volume percent to about 20 volume percent of the coating.

Using less than about 2 volume percent of lubricant particles, results in poor brush abrasion resistance and heat build up at the brush-slip ring contact interface. Using over about 20 volume percent of lubricant particles, results in a decrease in electrical conductivity with resulting higher voltage drop. Using lubricant particles less than about 0.5 micron generally contributes to agglomeration problems during electro-co-deposition. Using lubricant particles over about 75 microns results in an overly rough surface where the particles are not adequately bonded to the metal component and may easily shear off the elements during brush-slip ring contact, leaving deep gaps in the coating.

Figure 2:
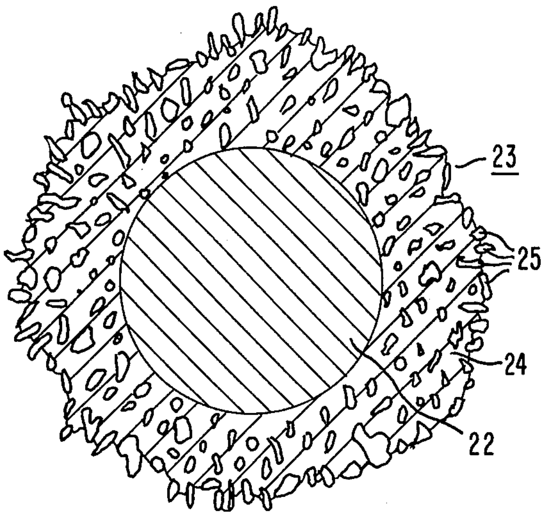
FIG. 2 is a cross-sectional illustration of a plated brush fiber of this invention.

The coating itself ranges in thickness from between about 5 microns to about 1,000 microns, in the form of a rough porous surfaced mass. A cross-sectional view of the coated wire is shown in FIG. 2. The brush element or fiber 22, such as a copper wire, is surrounded by a coating 23, consisting of a deposited metal matrix 24, such as copper or silver, encapsulating and including the lubricant particles 25, such as $MoS_2$, and holding them firmly in place. The metal forms a continuous phase while the included lubricant particles are evenly distributed through the metal matrix. This coating provides outstanding heat and electric conductivity and metal contact with the slip ring, while providing excellent lubricity at the surface of the slip ring. Coatings under 5 microns tend to have an insufficient concentration of lubricant which is not completely included by the metal component. Coatings over 1,000 microns tend to mass the brush elements providing a solid brush rather than one with a plurality of elements.

Additionally, a final film of silver (not shown in FIG. 2) can be plated over the surface of the coated elements if copper is used as the metal coatings, in order to prevent copper oxidation. The coated wire is then annealed at an effective temperature, usually between about 400° C. to about 600° C., for about 1 to about 4 hours, generally in an $H_2$ or $N_2$ gas stream, as is well known in the art, and then slowly cooled to 25° C. This annealing is used to remove brittleness from the coating, to improve adhesion of the coating to the wire, and to improve bonding of the lubricant to its metal matrix. The fibers are then cut to a suitable length and fixed into a holder.

Although the invention has been described hereinabove for use in homopolar type electric machines, it is to be understood that the invention can be used advantageously in any type of rotating or linear electric machine or device, such as large motors or generators, requiring an electrically conducting path between two parts, where one or both parts are moving relative to one another. Thus the brush may be attached to either a stationary or a moving member.

EXAMPLE 1

Figure 3:
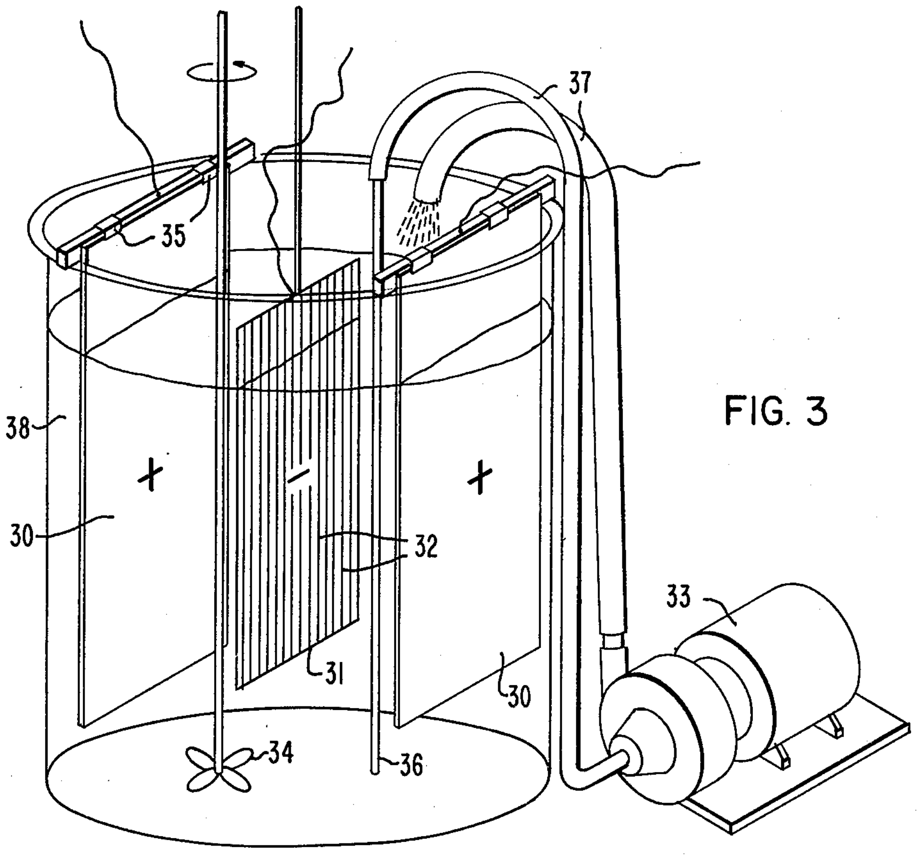
FIG. 3 is a three dimensional illustration of the laboratory apparatus used in the Examples to electro-codeposit metal-solid lubricant composite coatings.

A single bundle brush was made from copper elements electro-co-deposited with silver-$MoS_2$. The laboratory apparatus used in the electro-co-deposition is shown in FIG. 3. The electrolyzer consisted of a glass container, two flat silver anode plates 30 suspended in the container, and one copper wire-wound cathode 31 suspended between the anodes. The cathode substrate 31 was a hollow glass frame with a glass handle, all made of Pyrex glass rod. The copper wires 32 to be electroplated were wound on the glass frame so that the wires would not block their surfaces from each other during plating. The electrodes were connected to a d.c. power source. Mixing of the electrolyte was carried out with an external recirculating pump 33. An internal plastic impeller 34 at the bottom of the electrolyzer was also used at current densities over 1 $A/dm^2$. Anode supports are shown as 35, glass tubing as 36 and rubber tubing as 37.

A high speed, 1,800 rpm, Waring blender was employed to pre-mix the electrolyte with the solid lubricant powder. A sprinkle of ethanol was occasionally applied on the top of the blended electrolyte in order to break the foams formed during blending.

Before plating, the copper wire cathode was degreased with acetone, rinsed with water, and then etched with hot sulfuric acid solution (6 N) to remove surface oxides. The current density for co-deposition was 0.08 $A/dm^2$ in silver electrolyte. The plating period was 20 hours. The copper wire was 100 microns in diameter.

The silver electrolyte solution 38 consisted of: 40 g/l (of electrolyte) of freshly precipitated AgCl; 200 g/l of $K_4Fe(CN)_6.3H_2O$; 30 g/l of $K_2CO_3$; and 1.5 g/l of KCN, to provide a silver electrolyte plating solution. To this, 0.2 g/l of $Tl_2SO_4$ was added to help provide uniform co-deposition. Finally, 50 g/l of technical grade $MoS_2$, having an average particle size of about 4 microns, was added to the electrolyte plating solution.

After the 20 hour electro-co-deposition was completed, the cathode was removed from the silver-$MoS_2$ plating bath and the copper wire 32 unwound from the glass frame 31. The copper wire which had a 50 micron coating, was annealed in a hydrogen stream at 500° C. for about 1 hour, and then cut into 150 segments of a suitable length, each about 1 inch long. Four of these deposition cycles yielded 600 Ag-$MoS_2$ coated fiber segments, which were inserted into a piece of copper tubing having a 9 mm. inside diameter. The copper tube end was then squeezed tight in order to fix and hold the coated copper fiber elements in place and form a 600 element brush.

The coating on each element constituted between about 60 wt.% to about 65 wt.% of the coated wire. The $MoS_2$ constituted about 15 vol.% of the silver-$MoS_2$ coating. Cross sections of the coated copper wire elements were observed under a 50 power microscope. The cross section resembled that shown in FIG. 2 of the drawings, with a continuous silver matrix encasing the uniformly distributed, irregularly shaped lubricated particles. The end of each element has a sheared copper core surrounded by the conducting, lubricating coating.

Figure 4:
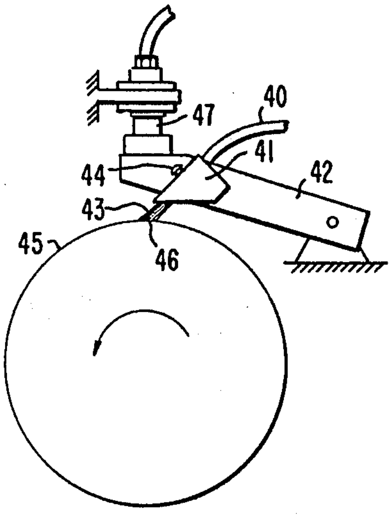
FIG. 4 is a schematic illustration of the brush testing apparatus used in the examples.

The brush was tested in a simple gravity loaded current collector system, similar to that shown in FIG. 4. The system was enclosed in a sealed chamber to permit control of the atmosphere, which was a continuous flow of dry $CO_2$. The brush end was extended approximately 0.48 inch (24 millimeters) from the holder.

As shown in FIG. 4, a copper wire cable 40 was attached to the brush and fitted into a holder 41, attached to a loading arm 42. The spread brush end 43 protruded from the front of the holder. A set-screw 44 locked the brush in position for testing, but permitted renewal of the brush by advancing the cable 40, which was also used as the current shunt. The shunt was positioned to minimize its effect in the brush contact force which was measured after electrical connections were completed. The sealed chamber is not shown.

The brush 43 was set at about a 45° angle relative to an 82.6 millimeter diameter slip ring surface 45. The slip rings used were silver. The slip ring speed was maintained at 3,000 ft./min. The contact pressure of the brush on the slip ring was about 5 watts, as estimated from the additional power dissipation by the motor which drove the slip ring on test, due to the applied brush pressure. The brush was positive relative to the slip ring. Current densities were calculated in terms of the total cross-sectional area of each fiber. The results are shown below in Table 1, each for six hour running periods:

TABLE 1

| Current Density (Amp/in$^2$) | Sliding Speed (ft/min) | $MoS_2$ in Coating (Vol. %) | Coating Thickness (microns) | $MoS_2$ Size (microns) | Total Power Loss (watts/amp) |
|---|---|---|---|---|---|
| 2,000 | 3,000 | 15 | 50 | 4 | 0.18 |
| 2,840 | 3,000 | 15 | 50 | 4 | 0.22 |

This data, from a simulated high-current, rotating machine environment shows very low total power losses (mechanical plus electrical). The silver plated slip ring was examined after 6 hours and showed substantially no wear.

EXAMPLE 2

In this Example, a 132 element copper brush was tested. Each copper was 100 microns in diameter. The electrolyzer was the same as used in Example 1 except that copper anode plates were used, the current density was 2.3 A/dm$^2$ and the internal impeller was used. The wire was treated prior to plating as described in Example 1. Copper electrolyte solution was used and consisted of 200 g/l (of electrolyte) of $CuSO_4.5H_2O$ and 50 g/l of $H_2SO_4$. To this 0.2 g/l of $Tl_2SO_4$ was added. Finally, 15 g/l of natural graphite, having an average particle size of about 2 microns, was added to the electrolyte plating solution.

After a 1 hour electro-co-deposition period the cathode was removed from the copper-graphite plating bath and placed in a silver plating bath not containing any lubricant, to deposit a coating of a final thin film of silver over the copper-graphite coating, in order to prevent copper oxidation. The cathode was removed from the bath and the copper wire was unwound from the glass frame. The copper wire, which had a 50 micron coating was annealed at 500° C. on a hydrogen stream for about 1 hour and then cut into 132 segments, each about 1 inch long.

These Cu-graphite coated fiber segments were inserted into a piece of copper tubing holder having a 3 mm. inside diameter. The copper tube end was then squeezed tight in order to hold the copper fiber elements in place and form a 132 element brush.

The coating on each element constituted between about 58 wt.% to about 60 wt.% of the coated wire. The graphite constituted 6.3 vol.% of the copper-graphite coating. The cross section of the coated copper wire was similar to that described in Example 1. The brush was tested in a current collector system similar to that described in Example 1 except that the slip ring speed was 3,300 ft./min. and an atmosphere of wet Argon (dew point=0° C.) was used. The brush was positive to the silver plated slip ring. Current densities were calculated in terms of the total cross-sectional area of each fiber. The brush load pressure was 22 g. The results are shown below in Table 2, each for a six hour running period:

TABLE 1

| Current Density (Amp/in$^2$) | Sliding Speed (ft/min) | Graphite In Coating (Vol. %) | Coating Thickness (microns) | Graphite Size (microns) | Total Power Loss (watts/amp) | Voltage Drop (mv) |
|---|---|---|---|---|---|---|
| 6,000 | 3,300 | 6.7 | 50 | 2 | 0.09 | 36.0 |
| 8,000 | 3,300 | 6.7 | 50 | 2 | 0.09 | 46.5 |

The total power loss at 8,000 Amp./in.$^2$ was only 0.09 watts/amp., showing that even at very high current densities, there is a very low total power loss (mechanical plus electrical) and excellent demonstrated lubricity.

Using colloidal graphite as a substitute for the 2 micron graphite used above, a coating was provided, containing below 0.5 vol.% graphite. This coating did not provide adequate lubricity.

The use of silver or other type fibers mentioned above, or the use of other lubricants, such as $WS_2$, $WSe_2$, etc. would produce similar excellent results.

I claim:

1. A current transfer brush, for a high-current electrical machine, in frictional contact with a member of the machine, said brush comprising a plurality of metal fibers, each fiber plated with a metal-lubricant coating, the coating metal being selected from the group consisting of silver, nickel, copper and mixtures thereof, the metal forming a matrix for uniformly distributed lubricant particles having an average particle size of between about 0.5 micron and about 75 microns, said metal fiber and coating being annealed together and said coating being effective to provide a lubricating effect and minimize wear at the area of frictional brush contact.

2. The current transfer brush of claim 1, where the metal brush fibers are selected from the group consisting of copper, silver, rhodium, gold, cobalt, aluminum, and molybdenum, having a diameter of between $4\times10^{-4}$ inch and $4\times10^{-2}$ inch, and a length of between about 0.08 inch and about 1.0 inch.

3. The current transfer brush of claim 1, where the lubricant particles constitute from about 2 volume percent to about 20 volume percent of the metal-lubricant coating.

4. The current transfer brush of claim 1, where the lubricant particles are selected from the group consisting of graphite, $MoS_2$, $MoSe_2$, $WS_2$, $WSe_2$, $NbS_2$, $NbSe_2$, $TaS_2$, $TaSe_2$, BN, and mixtures thereof, and the brush has a final film of silver coated thereon.

5. The current transfer brush of claim 1, wherein the coating thickness is between about 5 microns to about 1,000 microns and the coating is annealed to the metal brush fiber at a temperature of between about 400° C. and about 600° C.

6. The current transfer brush of claim 1, wherein the metal brush fibers are copper, the metal matrix of the coating is selected from the group of silver and copper and the lubricant particles are selected from the group consisting of graphite, $MoS_2$, $MoSe_2$, $WS_2$, $WSe_2$ and mixtures thereof.

7. The current transfer brush of claim 1, where the fibers are pressed tightly together to form a subdivided highly packed brush.

8. The current transfer brush of claim 6 in a high current rotating homopolar machine, where the rotating member is a rotor.

* * * * *